United States Patent
Hershey et al.

(10) Patent No.: US 10,750,420 B2
(45) Date of Patent: Aug. 18, 2020

(54) INTELLIGENT HETEROGENEOUS WIRELESS HANDOFF

(71) Applicant: General Electric Company, Schenectady, NY (US)

(72) Inventors: John Erik Hershey, Ballston Lake, NY (US); John Anderson Fergus Ross, Niskayuna, NY (US); Michael James Hartman, Clifton Park, NY (US); Richard Louis Zinser, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/056,007

(22) Filed: Aug. 6, 2018

(65) Prior Publication Data

US 2018/0343597 A1    Nov. 29, 2018

Related U.S. Application Data

(63) Continuation of application No. 15/277,630, filed on Sep. 27, 2016, now Pat. No. 10,064,114, which is a continuation of application No. 12/687,673, filed on Jan. 14, 2010, now Pat. No. 9,473,999.

(51) Int. Cl.
*H04W 36/24* (2009.01)
*H04W 36/26* (2009.01)
*H04W 36/14* (2009.01)

(52) U.S. Cl.
CPC ......... *H04W 36/245* (2013.01); *H04W 36/26* (2013.01); *H04W 36/14* (2013.01)

(58) Field of Classification Search
CPC .... H04W 36/245; H04W 36/26; H04W 36/14

USPC .................................. 455/436, 438
See application file for complete search history.

(56) References Cited

U.S. PATENT DOCUMENTS

| 5,155,806 A | 10/1992 | Hoeber et al. |
| 5,157,768 A | 10/1992 | Hoeber et al. |
| 5,388,251 A | 2/1995 | Makino et al. |

(Continued)

FOREIGN PATENT DOCUMENTS

| CN | 101518123 A | 8/2009 |
| GB | 2322051 A | 8/1998 |

OTHER PUBLICATIONS

EP Search Report issued in connection with corresponding EP Patent Application No. 10195582.1 filed on Dec. 17, 2010.
Chinese Office Action dated May 6, 2014.

*Primary Examiner* — Chuck Huynh
(74) *Attorney, Agent, or Firm* — Fletcher Yoder P.C.

(57) ABSTRACT

Provided are methods and systems of managing vertical handoffs in a wireless communication network. Embodiments include analyzing wireless device usage to determine usage patterns, which may include locations and times at which the wireless device is typically accessing the network. The network may recognize points in the usage patterns at which signal quality parameters are typically reduced. Such reductions in signal quality parameters may lead to inefficient vertical handoffs. The network may decrease adverse effects of inefficient vertical handoffs by reducing ping ponging, selecting links between wireless devices and network nodes, or indicating to a user of the wireless device that delays and/or data loss may occur.

11 Claims, 3 Drawing Sheets

(56) References Cited

U.S. PATENT DOCUMENTS

| | | | |
|---|---|---|---|
| 6,097,953 A * | 8/2000 | Bonta | H04W 36/30 |
| | | | 455/436 |
| 7,100,123 B1 | 8/2006 | Todd et al. | |
| 7,149,968 B1 | 12/2006 | Ackerschewski et al. | |
| 7,161,914 B2 | 1/2007 | Shoaib et al. | |
| 7,673,251 B1 | 3/2010 | Wibisono | |
| 8,064,911 B2 * | 11/2011 | Kim | H04W 36/30 |
| | | | 455/438 |
| 2002/0075409 A1 | 6/2002 | Kwon et al. | |
| 2002/0180697 A1 | 12/2002 | Freiberger et al. | |
| 2002/0184339 A1 | 12/2002 | Mackintosh et al. | |
| 2004/0117442 A1 | 6/2004 | Thielen | |
| 2005/0268234 A1 | 12/2005 | Rossi, Jr. et al. | |
| 2006/0148479 A1 | 7/2006 | Park et al. | |
| 2007/0021119 A1 | 1/2007 | Lee et al. | |
| 2007/0106956 A1 | 5/2007 | Platt et al. | |
| 2007/0113180 A1 | 5/2007 | Danninger | |
| 2007/0133471 A1 | 6/2007 | Kim et al. | |
| 2007/0133472 A1 | 6/2007 | Kim et al. | |
| 2007/0265001 A1 | 11/2007 | Dias et al. | |
| 2007/0266500 A1 | 11/2007 | Dias et al. | |
| 2008/0070575 A1 | 3/2008 | Claussen | |
| 2008/0109722 A1 | 5/2008 | Gengler et al. | |
| 2008/0178223 A1 | 7/2008 | Kwoh et al. | |
| 2008/0244460 A1 | 10/2008 | Louch | |
| 2008/0301558 A1 | 12/2008 | Najafi et al. | |
| 2009/0049408 A1 | 2/2009 | Naaman et al. | |
| 2010/0146546 A1 | 6/2010 | Nishimura et al. | |

\* cited by examiner

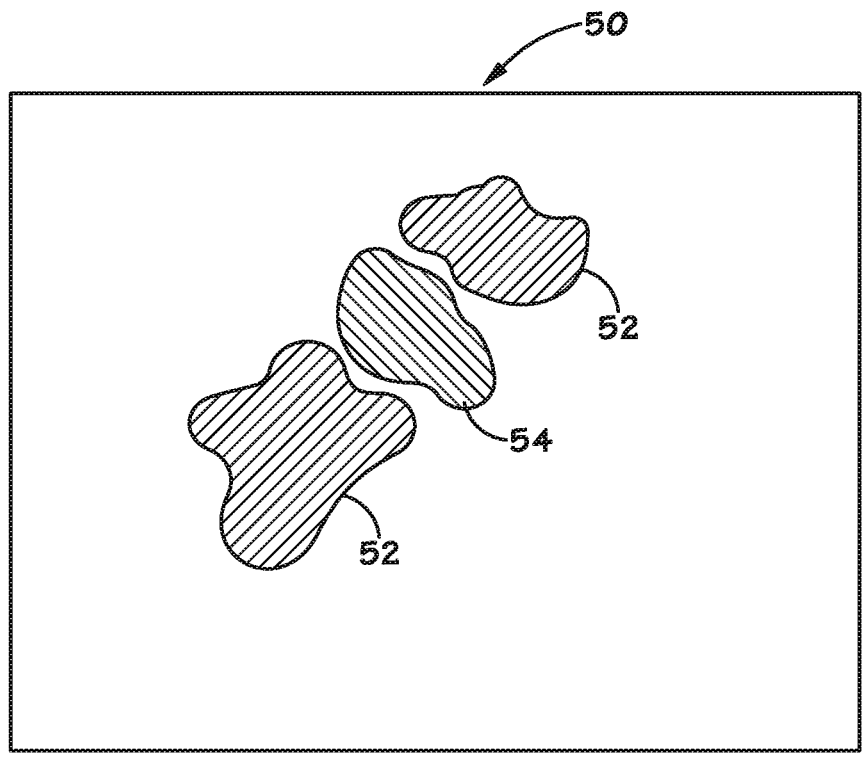
FIG. 2
FIG. 3
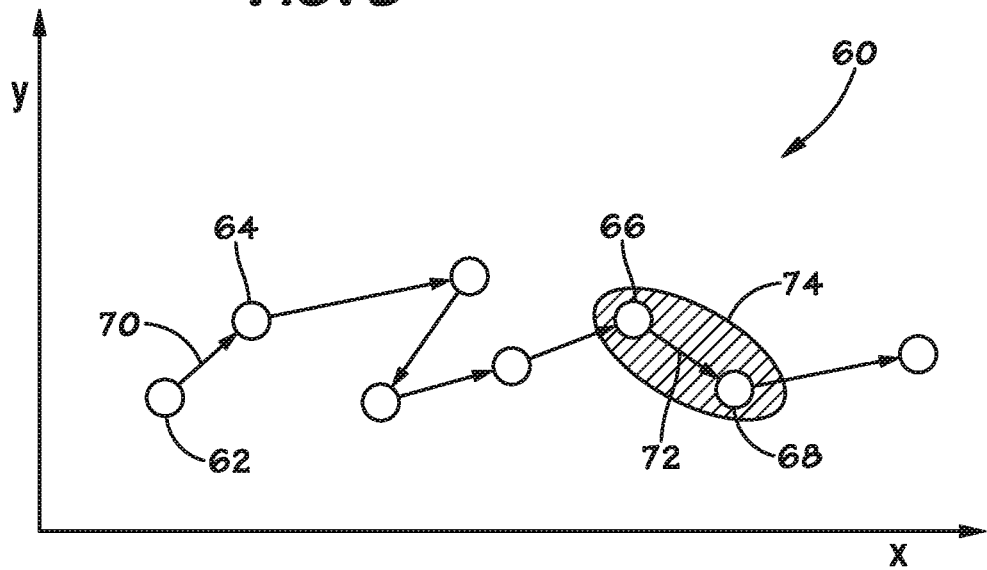

INTELLIGENT HETEROGENEOUS WIRELESS HANDOFF

CROSS REFERENCE TO RELATED APPLICATIONS

This application is a continuation of U.S. patent application Ser. No. 15/277,630, entitled "Intelligent Heterogeneous Wireless Handoff," filed Sep. 27, 2016, which is a continuation of U.S. patent application Ser. No. 12/687,673, entitled "Intelligent Heterogeneous Wireless Handoff," filed Jan. 14, 2010, now U.S. Pat. No. 9,473,999, which issued on Oct. 18, 2016. Each of the foregoing applications is hereby incorporated by reference in its entirety for all purposes.

BACKGROUND

The invention relates generally to communication systems, and more specifically, to handoff techniques in a communication network.

A wireless communication network may include devices capable of communicating wirelessly. The network may include network nodes, and one or more devices may communicate with each network node to access the communication network. For example, a wireless device may communicate with the network node capable of providing the best signal strength, which may be the network node closest to the location of the device. As a wireless device changes location (e.g., a mobile phone user may take the phone from one end of a city to another), the network node capable of providing the best signal strength may also change. Thus, a wireless device communicating with one node may experience a "handoff" as a portion of the path of the communication (e.g., the call, data session, etc.) is transferred from one network node to another. Handoffs which occur between like network nodes, referred to as "horizontal handoffs," may occur substantially seamlessly. For example, when a communication path between a mobile phone and one base station is transferred to another base station, the horizontal handoff may occur with little delay, such that packet loss is undetected by the user.

As wireless communication systems have evolved, the number of different link layer technologies in a communication network has increased, potentially complicating the handoff process between a wireless device and a network node. A wireless communication system may include network nodes having different access technologies, such as base stations and access points, to connect different wireless devices, such as mobile phones, laptops, personal digital assistants, etc., to the wireless communication network. In such a heterogeneous wireless communication network, different wireless devices may also communicate with different network nodes, which may have different link layer technologies. For example, a mobile phone may communicate with one or more different base stations or access points, depending on the signal strength in a particular communication path. Such transfers of communication between different types of network nodes (e.g., from a base station to an access point) may be referred to as a "vertical handoff." However, vertical handoffs may have increased delays (compared to the relatively seamless horizontal handoff), and inefficient vertical handoffs may result in packet loss, or terminated communications. For example, some delays may result from oscillating vertical handoffs, commonly referred to as the "ping pong" effect. Thus, a method of managing vertical handoffs may improve communication quality in a wireless communication network.

BRIEF DESCRIPTION

One embodiment includes a method of managing a communication in a wireless communication network. The method includes utilizing a processor coupled to the wireless communication network for analyzing the usage pattern of a wireless device in the network, predicting any locations and/or times in the usage pattern that have decreased signal quality (referred to as a predicted decreased signal quality segment) in a link in the network, and controlling a vertical handoff based on the predicted decreased signal quality segment.

Another embodiment provides a method of managing a vertical handoff for a communication in a network. The method includes using a processor in the network for determining a point in the network where inefficient vertical handoffs have occurred. The point may include one or more time and location estimates of where inefficient vertical handoffs have occurred, or are likely to reoccur. The processor may then reduce adverse effects of vertical handoffs by preventing ping ponging, selecting a link between a wireless device and a network node prior to the point of inefficient vertical handoffs, saving data related to a communication prior to the point, and/or warning a user prior to the point.

Yet another embodiment provides a system capable of managing vertical handoffs in a wireless communication system. The system includes one or more processors suitable for analyzing usage patterns for one or more wireless devices in the network, predicting one or more points (which are a function of time and location) having reduced signal quality parameters, and controlling vertical handoffs during the time and location of the points to reduce negative affects of inefficient vertical handoffs.

DRAWINGS

These and other features, aspects, and advantages of the present invention will become better understood when the following detailed description is read with reference to the accompanying drawings in which like characters represent like parts throughout the drawings, wherein:

FIG. 2 illustrates an example of a map based on usage patterns of wireless devices in a communications network, in accordance with embodiments of the present techniques;

FIG. 3 illustrates an example of a usage pattern of a wireless device, in accordance with embodiments of the present techniques.

DETAILED DESCRIPTION

Figure 1:
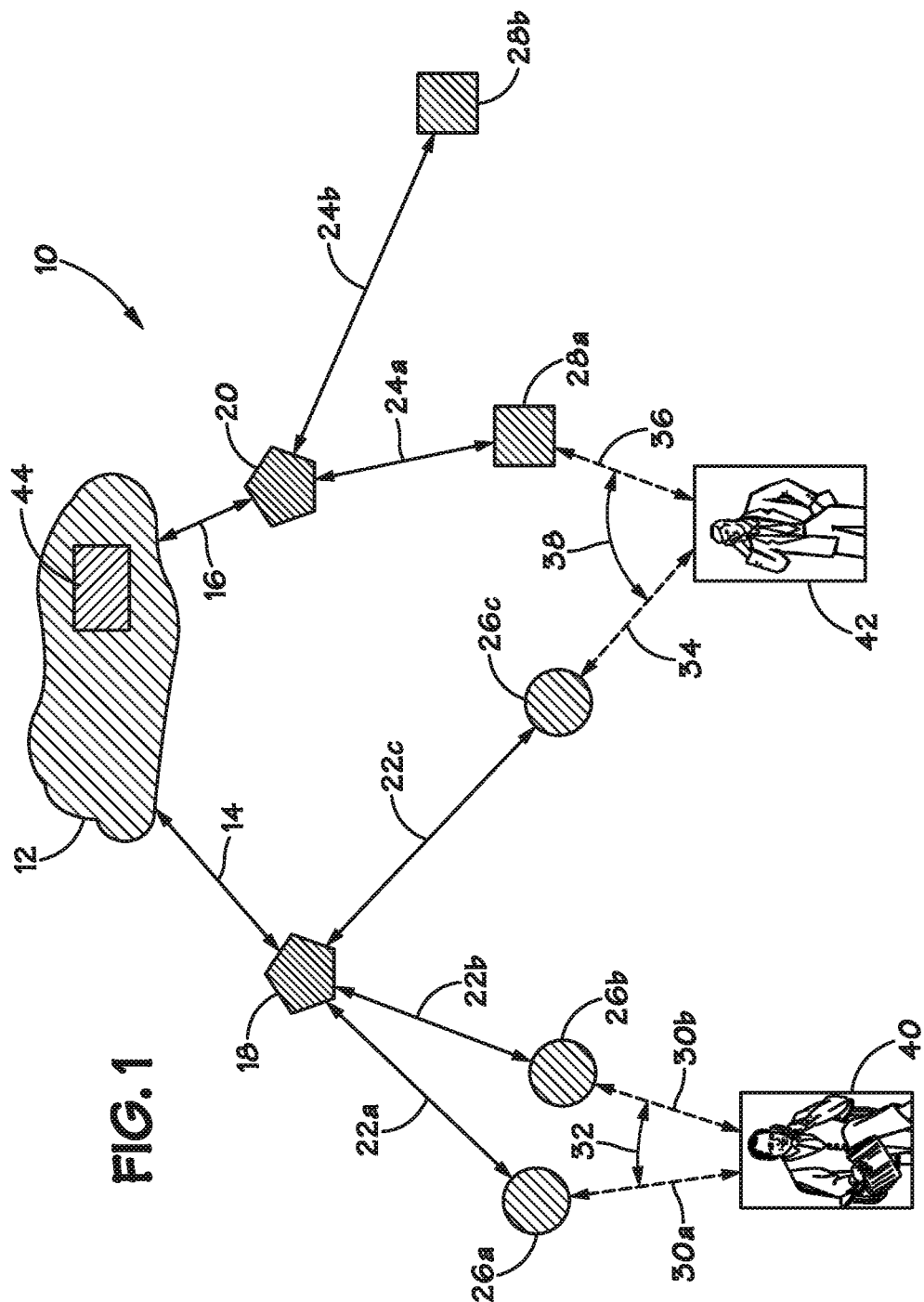
FIG. 1 depicts a communications network having one or more access technologies which may involve horizontal and/or vertical handoffs, in accordance with embodiments of the present techniques.

In a wireless communication network, a wireless device may communicate with other devices in the network by connecting to the network via links with one or more network nodes. Each network node may be linked to controllers or gateways, which may be linked to a common communications medium. For example, a communication (e.g., between two mobile phones) within a network may include a pathway of links between two communicating devices, which may include links between each device (e.g., a mobile phone) and a network node (e.g., a base station). A "link" may refer to a communication path, a connection, or a transferred signal, etc., between a wireless device, a network node, or a controller in the network, which connects every element in the network. A processor in the communication network may link the mobile phone to a particular network based on which network node is suitable for providing the best signal strength in linking with the mobile phone. During the duration of the communication, the signal strength between a mobile phone and a base station may change (e.g., if one user changes in location with his mobile phone). Such a change in signal strength may result in a "horizontal handoff," or a transfer in communication paths from one network node to a like network node.

A heterogeneous wireless communication network may include different types of network nodes in addition to the base station example previously given, such as access points for WiFi' enabled devices (also referred to as "wireless devices"). During a communication in a heterogeneous communication network, a communication path of a wireless device may include link transfers between a base station and an access point, which are network nodes having two different types of access technologies. This "vertical handoff," or a transfer in communication paths from one network node to a different type of network node, may be made by a processing unit in the communication network based on the signal quality of one or more links in the communication path.

Signal quality may be evaluated based on various parameters. As communication links in a network may include analog signaling and digital processing, signal quality parameters may be evaluated in the analog domain and/or the digital domain. For example, in the analog domain, processes that degrade signals may include noise, which may be produced by natural means (e.g., thermal noise), interferences resulting from other users of the same frequency spectrum, and/or distortion (e.g., distortion resulting from nonlinear receiver circuitry effects excited by the received signal). Examples of metrics used to identify and evaluate the degradation processes in the analog domain may include a signal-to-noise estimation ratio (SNR), signal-to-interference ratio (SNI or SNJ in the case of intentional jamming), signal-to-noise-and-interference ratio (SNIR), and signal-to-noise-and-distortion ratio (SINAD). In the digital domain, signal degradation from any source may be evaluated as the bit error rate (BER) or symbol error rate (SER).

In some communication systems, a vertical handoff decision may be made when one or more signal quality parameters fall below a certain threshold. For example, each time the BER falls below some value, the wireless communication network may automatically transfer a link between a wireless device and a first network node to a second network node. However, during a communication, signal strengths in a link between the device and the network node may sometimes oscillate. If the network conducts a vertical handoff each time the signal strength oscillates below a threshold, the communication may experience delays or disruptions as vertical handoffs are attempted between one network node to another.

The disruptions may be caused by too much hysteresis in the network selection process (e.g., selection between one base station and another access point), which may lead to delays (i.e., relatively extended periods of no communication). Delays may result in packet loss and/or a termination of the communication. On the other hand, too little hysteresis may also lead to delays, as a link between a wireless device and one network node may not be transferred to another network node, even when the signal quality is unacceptably low.

One or more embodiments include techniques for managing vertical handoffs based on signal quality parameters, as well as spatial and time usage patterns associated with one or more wireless devices in a wireless communication network. Wireless device users in a network may use their devices in a way such that a processor in the network is able to recognize spatial and time patterns associated with the usage of the wireless devices. The patterns may include attempts to access the network at locations where an acceptable link (e.g., based on one or more signal quality parameters) cannot typically be established or maintained between a wireless device and a network node. While reduced signal quality may result in too little or too much hysteresis during a network selection process, leading to inefficient vertical handoffs, embodiments of the present techniques include managing vertical handoffs such that vertical handoffs may be more efficient.

For example, a wireless communication network may establish an improved vertical handoff technique based on the predicted locations and/or times when a link between a device and a network node may have a relatively lower signal quality. In some embodiments, the network may reduce ping ponging by selecting a particular network node which links with certain wireless devices accessing the network at some time and/or location. Further, the network may also alert the wireless device user of potentially weak signals, such that the user may be prepared to not expect a strong signal during the communication, or the user may be prepared to save data, pause communications, or reduce the communications rate.

A diagram of one example of a wireless communication network 10 is illustrated in FIG. 1. The network 10 may include a common communications medium 12, such as the Internet, which may be the common medium linking all of the devices in the network. As discussed, a "link" may refer to a communication path, a connection, or a transferred signal, etc., between any network elements (e.g., wireless devices, network nodes, controllers, etc.) in the wireless communication network 10. Further, the illustrated network 10 may represent a portion of a network in accordance with the present techniques, which may include multiple types of wireless devices (e.g., such as those used by users 40 and 42), other types of network nodes, and other types of controllers.

In the illustrated network 10, one or more controllers 18 and 20 may be linked to the medium 12 (e.g., via link 14 and 16, respectively). The controllers 18 and 20 may be media gateway for network nodes. For example, one or more network nodes, such as base stations 26a, 26b, and 26c may be linked to the base station controller 18 via links 22a, 22b, and 22c. Likewise, one or more network nodes, such as access points 28a and 28b may be linked to the access point controller 20 via links 24a and 24b. The network nodes (e.g., 26a-c, 28a, and 28b) may then have links to various wireless devices. For example, a wireless device used by a first user 40 may be linked to a base station 26a via link 30a, and another wireless device used by a second user 42 may be linked to an access point 28a via link 36.

Typically, each base station 26a, 26b, or 26c in network 10 may communicate with one or more wireless devices, such as a mobile phone. Similarly, each access link 28a or 28b may communicate with one or more different wireless devices, such as a laptop computer capable of wireless communication. As wireless communication networks have developed, different types of network nodes (base stations, access points, etc.) may be linked with different types of wireless devices (mobile phones, laptop computers, etc.), and further, a network 10 may transfer a link between a wireless device and a different type of network node, depending on various factors, such as the signal quality parameters of the links, or costs associated with the links.

A link or a transferred link made within the network 10 may be controlled by any suitable processor 44 in the network 10. The processor 44, as illustrated in the wireless communication medium 12, may be coupled to any device of the network 10 connected to the medium 12. For example, in some embodiments, the processor 44 may be coupled to one or more controllers in the network 10, such as the base station controller 18 or the access point controller 20. Furthermore, in some embodiments, the processor 44 may be coupled directly to network nodes such as base stations (e.g., base stations 26a, 26b, and 26c) and/or access points (e.g., access points 28a and 28b), or directly to wireless devices. The processor 44 may also be a separate processing unit accessible by one or more devices in the network 10. As will be further discussed, the processor 44 may determine signal quality parameters in the links in a network 10, and may also manage handoffs based on an analysis of signal quality parameters. Management of handoffs by the processor 44 may reduce handoff inefficiencies in the network 10.

An example of different types of handoffs may be provided by the depiction of a communication between the first user 40 and the second user 42. During an initial portion of this communication, the first user 40 may be linked via link 30a to base station 26a, and the wireless device of the second user 42 may be linked via link 36 to an access point 28a. Throughout the communication, the signal quality of the links 30a and/or 36 may change. For example, the processor 44 may monitor and/or analyze one or more of the signal quality parameters previously discussed. A variation in signal quality parameters or a drop in signal quality below some acceptable level may cause the processor 44 to make a handoff. For example, at some time during the communication, the signal quality of the link 30a may fall beneath some threshold, making the link 30a unacceptable for communication. The processor 44 may make a horizontal handoff 32, such that the wireless device of the user 40 is linked via link 30b to base station 26b. Similarly, at some time during the communication, the signal quality of the link 36 may fall beneath some threshold, making the link 36 unacceptable for communication. In some situations, a vertical handoff may be more suitable than a horizontal handoff. In this depiction, the processor 44 may make a vertical handoff 38, such that the wireless device of the user 42 is linked via link 34 to a different type of network node from the access point 28a, to the base station 26c.

As discussed, a vertical handoff 38 may be comparatively more complicated, and may take relatively more time than a horizontal handoff 32. A vertical handoff may involve further decoding and encoding of information as the information is transferred between two different types of access technologies (i.e., network nodes 26a-c, 28a, and 28b). Thus, oscillations in signal quality parameters of a link between a device and a network node, such as the device of user 42 and the access point 28a may result in oscillating vertical transfers (also referred to as the ping pong effect) to the base point 26c. Each time a vertical transfer is made in response to oscillating signal quality parameters, signals may first be decoded and/or encoded. Thus, while vertical transfers may sometimes be necessary and/or efficient, the ping pong effect (i.e., oscillating vertical transfers) may be uncontrolled and inefficient, and may result in delays, which leads to loss in the communication. For example, a voice communication between user 40 and user 42 may experience packet loss in the form of silences, dropped calls, or any other adverse effect resulting from vertical handoffs. A data transfer in the network 10 may experience packet loss in the form of interrupted transfers or lost data due to inefficiencies in vertical handoffs. In accordance with the present techniques, such vertical transfers may be conducted with reduced delays and/or packet loss.

In some embodiments, a network 10, or any suitable computer or processor in the network 10 such as the processor 44, may reduce the negative effects of inefficient vertical handoffs by managing vertical handoffs based on a usage pattern of wireless devices in the network 10. For example, the processor 44 may analyze usage patterns of wireless devices such that the processor 44 may predict when and/or where signal quality of links are typically low, or when vertical handoffs are likely to oscillate or occur. For example, the usage patterns may have time and/or spatial characteristics, where at some location, the processor 44 determines that one or more links between wireless devices and network nodes typically decrease in signal quality, and may be susceptible to a vertical transfer or to an oscillating vertical transfer.

The present techniques may be applied on any scale, and may include analyzing patterns and managing vertical handoffs for wireless devices in an entire wireless communication network, or for more than one wireless communication network. An example of how spatial patterns for wireless device usage may be analyzed may be represented in an illustration of a usage map 50 of FIG. 2. The area of the map 50 (including all white and shaded areas) may represent a spatial or geographical range in which wireless devices in a wireless communication network may access the network. The network area may be partially defined by the spatial location of controllers, base stations, and/or access points available to communicate with wireless devices in the network. Usage patterns of wireless devices within a network area (e.g., the area of the map 50) may be used to manage vertical handoffs on a relatively large scale.

The wireless communication network, or some suitable processor 44 in the network, may determine usage patterns of the wireless devices in the network, including spatial locations where the devices are accessing the network. An "access" to the network 10 may refer to a link between a wireless device and any network node, which enables the wireless device to receive, initiate, or maintain communications within the network. A wireless device may be accessing the network 10 whenever the device is activated. For example, an access may include attempts at initiating a link (e.g., links 22a-c, 24a, or 24b) by initiating and/or accepting a communication (e.g., a phone call or a data transfer), or maintaining a link when a user of a wireless device travels. In the map 50 of the network area, the shaded area 52 may be referred to as a common area 52, which may be an area where wireless devices commonly access the network 10. A network may find one or more common areas 52, including common areas 52 of different sizes and in different locations, depending on wireless device usage within one or more networks 10. A network 10 may also include areas in which communications between a wireless device and a network node is susceptible to decreased or oscillating signal quality parameters, referred to as problem areas 54. In a problem area 54, a wireless device may have reduced abilities to initiate, accept, and/or maintain a link.

A processor 44 in the network 10 may utilize information regarding the common area 52 and/or the problem area 54 to manage vertical handoffs. For example, a common area 52 may have more network nodes 26 and 28, as more wireless devices typically access the network 10 from the area 52. Therefore, a vertical handoff scheme based mainly on signal quality thresholds, or based on a selection of network nodes 26 or 28 having the best signal quality in linking with a wireless device may lead to oscillations, as many different links may be available and/or in close proximity. A method of managing vertical handoffs in a common area 52 may include establishing particular network nodes for connecting with particular wireless devices, and defining vertical handoffs for particular wireless devices. Further, the method may include maintaining a link between a wireless device and a network node for some amount of time, even when signal quality parameters oscillate, to reduce the ping ponging. For example, and referring back to FIG. 1, a vertical handoff 38 may occur for a wireless device of a user 42 between an access point 28a to a particular base station 26c. The base station 26c may be selected even if other stations 26a or 26b are available, to reduce the probability of having a connection jump between more than one station. Further, the processor 44 may manage the vertical handoff 38 to reduce adverse effects of signal quality parameter oscillations. For example, the processor 44 may make vertical handoffs 38 based on time and spatial usage patterns, and not based on relatively small variations of signal quality parameters. The processor 44 may also warn a user 42 that a vertical handoff 38 is to occur, which may indicate to the user 42 that a communication may be interrupted or otherwise adversely affected.

In some embodiments, vertical handoffs may also be managed based on usage patterns of one or more individual wireless devices. For example, in one embodiment, a method of vertical handoffs may be customized for a specific wireless device in a network 10. FIG. 3 is a diagram representing a spatial and time pattern 60 of wireless device usage which may be determined by the processor 44 in one embodiment. The pattern 60 may be represented as points 62, 64, 66, and 68 and time units (e.g., 70 and 72) and may include both spatial and time data. For example, the points 62, 64, 66, and 68 are illustrated on the graph as having a location with respect to the x-axis and the y-axis. A processor 44 may also identify common user areas using coordinates or some other way of identifying spatial location in the network area.

The processor 44 may also identify the pattern 60 of points 62, 64, 66, and 68 with respect to time. In some embodiments, the processor 44 in the network 10 may determine that the wireless device of the user accesses the network 10 from one or more locations in certain time patterns, such as daily pattern, weekly pattern, etc., or any length of time over which a pattern of locations of wireless device usage may be discernable. The arrows between each point 62, 64, 66, and 68 represent time units between user areas. For example, time unit 70 may be an estimate of duration between one point 62 and another point 64, and may be based on data such as average usages of the wireless device.

The pattern 60 of a wireless device may include areas and/or times where signal quality parameters vary. Variations in signal quality parameters, such as signal strength, SNR, SNI, SNIR, SINAD, BER, etc., below some threshold may cause a link between a wireless device and a network node to be prone to vertical handoffs, and sometimes, inefficient vertical handoffs such as ping ponging. The processor 44 may determine that one or more signal quality parameters between the wireless device and a network node often decreases when the device is accessing the network 10 from a certain area, or during a certain time in a pattern 60. For example, as depicted by the shaded area 74 encompassing the time unit 72 between the points 66 and 68 in the pattern 60, the network may determine that a link between the wireless device and a network node may have decreased signal quality parameters. During the time unit 72 (e.g., approximately one minute, one hour, etc.) that the user of the wireless device spends between point 66 and point 68 and/or in an area of point 66 or point 68, there may be attempts to access the network 10, resulting in one or more attempts at executing a vertical handoff. Such attempts at executing a vertical handoff may result in ping ponging, which may result in packet loss or termination of the communication.

Figure 4:
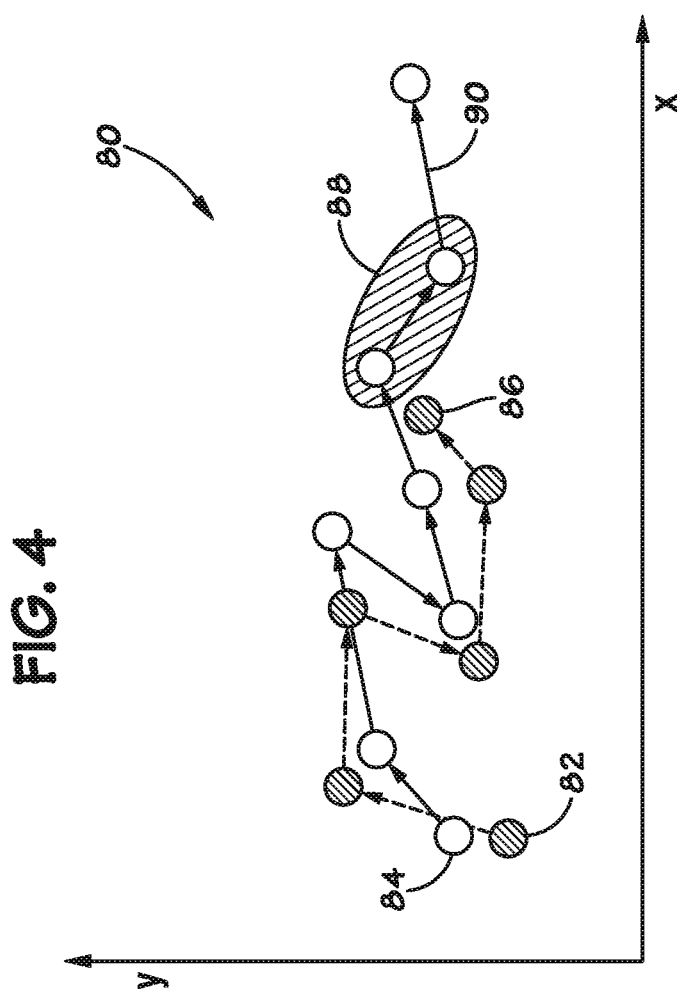
FIG. 4 illustrates a predicted path of a wireless device, based on the pattern of the device user, compared to an actual path of the wireless device, in accordance with embodiments of the present techniques.

In some embodiments, the processor 44 may be able to recognize areas and/or times when a link between the wireless device and a network node is likely to have a decrease in one or more signal quality parameters. The processor 44 may predict such signal quality decreases based on the pattern 60 to manage a vertical handoff or decrease adverse effects of inefficient vertical handoffs. An illustration representing how the wireless communication network may predict wireless device usage is represented in the plot 80 of FIG. 4, which shows an actual user path and a predicted path. The actual user path is represented by the clear circles, and the predicted path is represented as shaded circles (e.g., predicted points 82 and 86). The predicted path may be a prediction generated by the processor 44 based on data determined from the usage of the wireless device, such as the pattern 60 of FIG. 3.

The path predicted by processor 44 may be substantially similar to an actual path of the wireless device. For example, point 82 of the predicted path is adjacent to point 84 of the actual path, which may mean that the processor 44 may predict that the wireless device will be in use at a time and location that is at or substantially similar to the actual time and location which the wireless device is used. Such predictions may be useful for managing vertical handoffs at a particular time and/or location where a link between the wireless device and a network node experiences variations or decreases in signal quality parameters. For example, the processor 44 may recognize that a pattern is occurring, and that point 86 may occur prior to one or more locations and/or time units having decreased signal quality parameters, such as the predicted decreased signal quality segment 88. The network 10 may also recognize when the segment 88 has ended, such as at time unit 90, and management techniques of vertical handoffs may be accordingly modified.

The network 10, or a suitable processor 44 in the network 10, may utilize patterns, which may include predictions of signal quality decreases in some time and/or location, to design a more efficient vertical handoff and/or reduce the negative effects of inefficient vertical handoffs. For example, the network 10 may limit ping ponging by designating a link for a wireless device when signal quality parameters oscillate. In some embodiments, the processor 44 may preload data to reduce data loss prior to a likely delay resulting from vertical handoffs. The processor 44 may also provide an indication to the user, such that the user may better manage the communication and prepare for any adverse effects of inefficient vertical handoffs. For example, the user may be warned that the wireless device is entering a location where a strong signal should not be expected. The user may then modify expectations or behavior accordingly. An indication may also allow a user to prepare for possible data loss or communication failure by saving data before delays occur, or by pausing a conversation to prevent the conversation from being cut off later.

In some embodiments, management of vertical handoffs within a network 10 may improve the quality of the communication, and/or lower costs for the communication. For example, the processor 44 may enable a link between a wireless device and a certain type of network node based on a function of the costs of the link, and the quality of service (QoS) in executing and maintaining the vertical handoff. Furthermore, management of links by the processor 44 may extend beyond links between wireless devices and network nodes, and may also include links between network nodes and controllers, and links between controllers and the communication medium, etc. For example, a mobile phone provider may provide mobile phone service as well as internet supported mobile phone service or WiFi' service. The processor 44 may select different services, making different links based on a function of the costs of each service, and the quality provided by each service at some location and/or time.

Furthermore, the selection of services may also have QoS control mechanisms, and may design vertical handoffs based on the type of communication occurring in the network. For example, while a lower signal quality may be acceptable for a voice communication, and therefore not as heavily weighted in the selection process for services as cost, signal quality may be more heavily weighted in the selection process for a data transfers. In some embodiments, a wireless device user may have customizable QoS, and may be able to customize a link selection process and/or a vertical handoff technique based on a user's communication. For example, a user may select certain levels of desired signal quality based on types of access technologies or types of communication, or may set boundaries for acceptable link costs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for managing vertical handoffs in a wireless communication system, wherein the system comprises:
a processor configured to:
generate a predicted path of an individual wireless device based on a location of the individual wireless device and usage patterns of the individual wireless device;
analyze the predicted path of the individual wireless device to determine a predicted communication path of the individual wireless device along the predicted path;
predict a segment in the predicted path having a predicted reduced signal quality in the predicted communication path based on the usage patterns of the individual wireless device; and
control vertical handoffs in an actual communication path of the individual wireless device by designating a communication link that avoids the segment having the predicted reduced signal quality, wherein the communication link is designated based on a communication type of a communication of the individual wireless device in the predicted reduced signal quality segment, wherein the communication type is a voice communication and wherein the predicted reduced signal quality used to designate the communication link is relative to a threshold signal quality for the voice communication on the communication link, wherein the threshold signal quality set for the voice communication is lower than a threshold set for a data transfer signal quality for a data transfer communication type.

2. The system of claim 1, wherein the communication type is a voice communication or a data transfer.

3. The system of claim 1, wherein the processor designates the communication link for the communication comprising a voice communication based at least in part on a function of a signal quality and a cost of the communication link, wherein the function weights the cost more heavily than the signal quality.

4. The system of claim 3, wherein the signal quality is a predicted signal quality.

5. The system of claim 3, wherein the designed communication link for the communication is based on a predicted communication link cost below a maximum communication cost threshold.

6. The system of claim 1, comprising a control mechanism configured to set parameters for the processor to control the vertical handoffs along the segment for the individual wireless device based a least in part on user input.

7. The system of claim 6, wherein the parameters comprise a voice signal quality threshold or a maximum communication cost threshold.

8. The system of claim 1, wherein the processor is configured to designate additional communication links along the segment based on a function of signal quality and cost of the communication link.

9. The system of claim 1, wherein the processor is configured to initiate a vertical handoff to the designated communication link before the segment in the predicted path having the predicted reduced signal quality.

10. The system of claim 1, wherein the communication type is a first communication type and wherein the designated linked based on the first communication type is based on quality of service control mechanisms for the first communication type that are different than for a second communication type.

11. A system for managing vertical handoffs in a wireless communication system, wherein the system comprises:
a processor configured to:
generate a predicted path of an individual wireless device based on a location of the individual wireless device and usage patterns of the individual wireless device;
analyze the predicted path of the individual wireless device to determine a predicted communication path of the individual wireless device along the predicted path;
predict a segment in the predicted path having a predicted reduced signal quality in the predicted communication path based on the usage patterns of the individual wireless device; and
control vertical handoffs in an actual communication path of the individual wireless device by designating a communication link that avoids the segment having the predicted reduced signal quality, wherein the communication link is designated based on a communication type of a communication of the individual wireless device in the predicted reduced signal quality segment, wherein the communication link is a communication comprising a data transfer and the designating is based at least in part on a function of a signal quality and a cost of the communication link, wherein the function weights the signal quality more heavily than the cost.

* * * * *